Jan. 26, 1960 E. A. FINN 2,922,527

PHONOGRAPH RECORD HOLDER

Filed June 25, 1956

INVENTOR.
Elizabeth Ann Finn
BY Morton S. Adler
ATTORNEY

United States Patent Office 2,922,527

Patented Jan. 26, 1960

2,922,527

PHONOGRAPH RECORD HOLDER

Elizabeth Ann Finn, Des Moines, Iowa

Application June 25, 1956, Serial No. 593,543

11 Claims. (Cl. 211—40)

My invention relates to improvements in phonograph record holders or cabinets.

The instant invention contemplates the provision of a relatively lightweight, sturdy and attractive storage case or holder for phonograph records that is manually portable.

A further object inhering in this invention is the provision of a record holder of the above class in which the records are stored in individual closures of novel construction to assure their protection against dust, dirt, scratching and the like.

Another object herein is to provide a record holder for the purpose indicated which is so constructed that several can be detachably arranged in tiers to accommodate more records than the capacity for an individual holder.

Still another object is to provide means for removing or attaching individual record closures from and to this record holder.

A further object of this invention is to provide means for the suitable identification and indexing of the records.

A still further object is to provide means on my record holder for accommodating records of different sizes.

Other objects and advantages of this invention reside in the details of construction and correlation of the various parts and will be apparent as the description proceeds.

Figures 1, 2, 3:
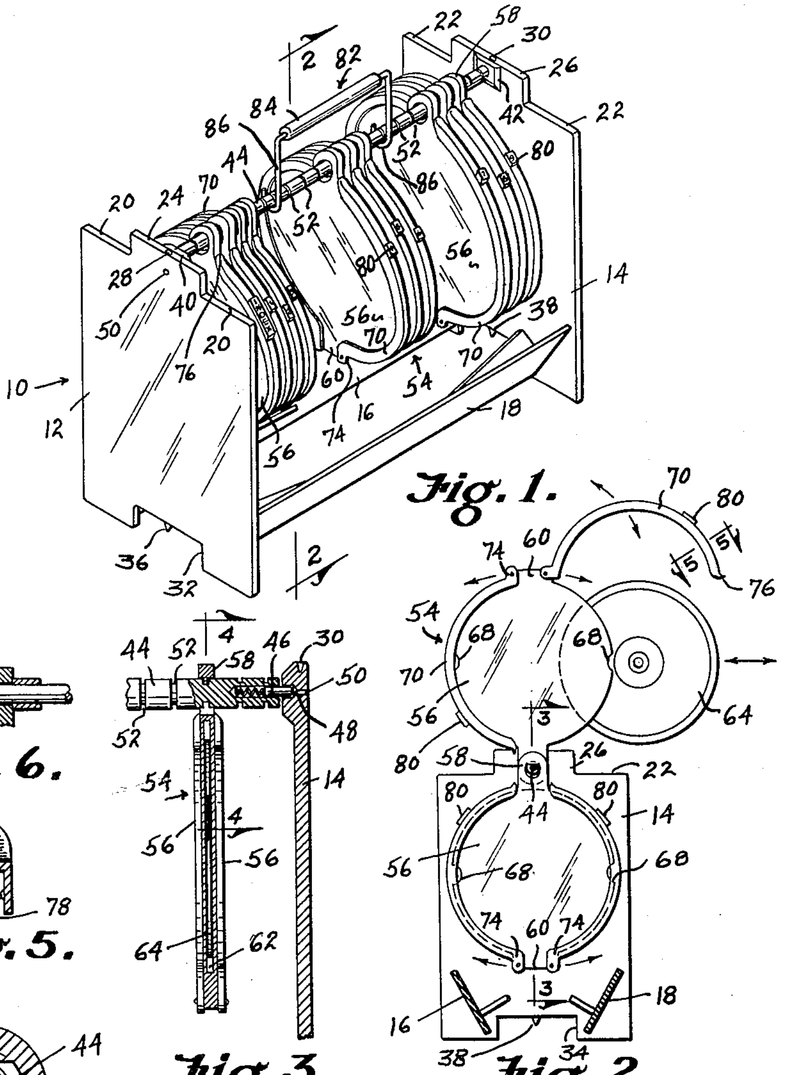
Figure 6:
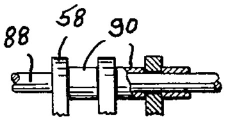
Figure 5:
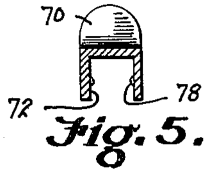
Figure 4:
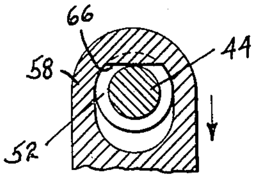
Figure 7:
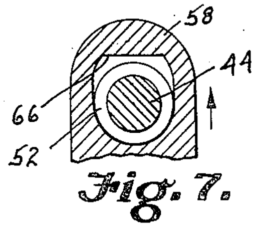
Figure 8:
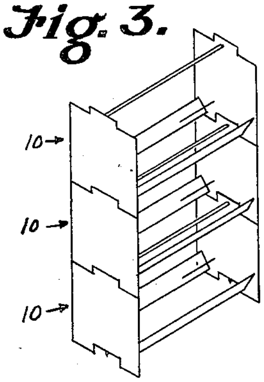

This invention consists of novel parts and combination of parts to be hereinafter described whereby the objects set forth are attained, as pointed out in the claims, and illustrated in the acompanying drawings in which:

Fig. 1 is a perspective view showing a preferred embodiment of my invention,

Fig. 2 is a cross sectional view taken on the line 2—2 of Fig. 1 showing the phonograph record storage member in different positions, Fig. 3 is a cross sectional view taken on the line 3—3 of Fig. 2, Fig. 4 is an enlarged cross sectional view taken on the line 4—4 of Fig. 3, Fig. 5 is an enlarged cross sectional view taken on the line 5—5 of Fig. 2, Fig. 6 is a fragmentary elevation, partly in section, of a modified arrangement for mounting the record storage member to the support rod, Fig. 7 is an enlarged section view similar to Fig. 4 but showing the record storage member positioned for movement on or off the supporting rod, and Fig. 8 is a reduced diagrammatic perspective view showing a tier stacking arrangement of this invention.

Referring to the drawings a stand or case indicated generally by the numeral 10 is formed from two upstanding sides 12 and 14 which are maintained in parallel spaced relationship by the brace members 16 and 18 preferably integrally formed at the lower portion thereof (Figs. 1 and 2). I have preferably used plastic for stand 10 because of its adaptability to use in several attractive colors and its lightness but it will be understood that any suitable material can be used as desired. Sides 12 and 14 are of like design and each is formed with the lowered step or shoulder 20 and 22, respectively, on the top edge so as to leave a central neck portion 24 and 26, respectively as shown. A well 28 and 30, respectively, is formed in the top of each neck 24 and 26. In the bottom edge of sides 12 and 14 is formed the respective notches 32 and 34 complementary in shape to neck portions 24 and 26 and each notch contains the depending boss or plugs 36 and 38, respectively. Thus, arranged, a plurality of stands 10 can be removably stacked in tier formation (Fig. 8) whereby a notch on the bottom of each side 12 and 14 embraces a neck portion on the top edge of the lower stand with the respective boss or plug seating itself in one of the wells. This makes a suitable storage media for stationary use and yet each stand 10 is easily removable for portability when desired.

The inner side of each neck portion 24 and 26 has an integrally formed bearing member 40 and 42, respectively, for holding a support element such as the rod 44. One end of rod 44 has a spring loaded pawl 46 (Fig. 3) which removably seats in a recess 48 in either of the bearing members 40 and 42 and the other end of the rod will likewise seat in a similar recess in the bear-member opposite to that in which the pawl is inserted. The end of pawl 46 may be tapered so that a lateral pull on rod 44 will cause it to retract but I have also provided a transverse opening 50 in the neck portion of the sides which registers with recess 48 so that any small instrument can be inserted to depress the pawl 46 when removal of rod 44 is desired. Rod 44 is also provided with a plurality of longitudinally spaced transverse grooves 52 for supporting the phonograph record storage members indicated generally by the numeral 54.

Members 54, preferably made of transparent plastic, are formed from a pair of like discs 56 held in spaced relationship by an integral apertured ear 58 projecting from the perimeter at the top and an integral shoulder 60 oppositely disposed from ear 58 at the bottom. Thus formed, a storage chamber 62 is provided for a phonograph record 64. In the aperture of each ear portion 58 there is formed an integral depending flange element 66 which is rockably seated in any one of the notches 52 in rod 44. The aperture in each ear is sufficiently large (Fig. 7) to permit each ear portion to be freely slid on or off the rod and when on the rod, the weight of the member 54 will maintain flange 66 in one of the slots or grooves 52. Slots 52 are spaced to allow free swinging of each member 54 for withdrawal or insertion of records 64 as will later appear. Each disc 56 is provided with notches 68 at diametrically opposite points thereof to facilitate the manual gripping of a record 64.

Each record storage member 54 is provided with a closure member 70 for embracing the perimeter of the discs 56 and thereby cover the opening between the discs into chamber 62 to prevent the entry of dust and the like. Preferably I use two members 70 although it will be understood that if chamber 62 communicates with only a portion of the perimeter instead of substantially all of it as I preferably show, one such member 70 will suffice. Members 70 are in the form of arcuate arms conforming in shape to the curvature of the perimeter of discs 56 and are each provided with a longitudinal groove or slot 72 on the inner or concave side as shown in Fig. 5. The lower end of each arm 70 has an ear 74 by which it is pivotally attached to the shoulder 60 of member 54 so it can be moved into position where slot 72 embraces the perimeters of each discs 56 to serve as a closure for chamber 62. In this position the top end of arm 70 which has the flared tip 76 abuts the outer side of the ear 58 (Figs. 1 and 2). Tip 76 facilitates the gripping of arm 70 for pulling it away from member 54 to insert or withdraw a record 64. Within slot 72 near the top end, I provide the oppositely disposed internally projecting ribs, tips or the like 78 (Fig. 5) for frictional engagement with discs 56 to prevent the accidental movement of arm 70 away from its closed position.

On the outer side of each arm 70, perferably in the upper portion thereof, I have placed a knob-like member 80. These serve the double purpose of acting as a handle for opening or closing the arm and also to be imprinted with or otherwise carry an identification number or indicia which will be listed in one of the members 54 that I use exclusively for an index. Knobs 80 are positioned so that on adjacent members 54 they are offset relative to each other and thereby as seen in Fig. 1 a plurality of members 54 create two separate rows of knobs that facilitate their identification. Such knobs 80 are on each arm 70 so that with this arrangement, the record 64 can be withdrawn from either side of the stand 10. The index card while not shown specifically, is a suitable paper or card shaped like a record 64 and carries a list of the several records 64 by number or other means corresponding to the similar identification on the respective knobs 80. I have made my index card identical on opposite sides so that it may be viewed through the discs 56 from either side.

As shown in Fig. 1 the record storage members 54 may be of different sizes to accommodate the different diameter records and for this purpose stand 10 is designed to accommodate these several sizes. A carrying handle 82 is provided for stand 10 and consists of a handle portion 84 with a depending hook member 86 at each end. Hooks 86 are merely engaged under rod 44 as shown in Fig. 1 and the handle can be removed when not required.

In Fig. 2 I show how member 54 can be moved on rod 44 but I wish to point out that it is not necessary to rotate member 54 a full 180° to remove a record 64, for a slight movement away from its position in Fig. 1 is sufficient.

It will be appreciated that by means of this record holder the records 64 will be adequately protected from dust and from scratching. The records can be easily transported in a group on one stand 10 or can easily be transported in an individual member 54, if desired. The stand 10 can be formed as an attractive piece of furniture and conveniently placed in a room either singly or in a group as shown in Fig. 8. The indexing provided is extremely convenient and always available to facilitate the selection of a desired record.

With reference now to Fig. 6 I show a modified arrangement for mounting the ear portion 58 or member 54 to a support element. Here the counterpart of rod 44 is shown as a plain rod 88 and the ears 58 are merely apertured to slide thereon with suitable washer-like spacer members 90 to keep members 54 in the desired spaced relationship. Such an arrangement is also satisfactory but it is believed to increase the time and costs of assembly of a unit such as I have described over the preferred arrangement disclosed.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified froms of structure or mechanical equivalents which may be reasonably included within their scope.

I claim:

1. A phonograph record holder, comprising, a pair of upstanding sides, brace means to maintain them in spaced relationship, a support member detachably mounted to and between said sides, a flat phonograph record storage member swingably detachably depending from said support member, said storage member provided with a chamber for holding a phonograph record, the top of each side provided with a well, a boss on the bottom of each side, and said boss and well respectively designed to register with a like well and boss on the sides of a second phonograph record holder as described whereby a second phonograph record holder can be placed in tier formation on the first.

2. A phonograph record holder, comprising, a horizontal rod provided with a transverse groove, means for supporting said rod, a discs shaped phonograph record storage member, an apertured ear integral with and projecting from a point on the perimeter of said storage member, an internally projecting flange from the aperture in said ear, and said ear mountable on said rod so that said flange removably and rockably seats in said groove whereby said storage member is swingably depended from said rod.

3. A phonograph record holder, comprising, a horizontal rod provided with a transverse groove, means for supporting said rod, a disc shaped phonograph record storage member, an apertured ear integral with and projecting from a point on the perimeter of said storage member, an internally projecting flange from the aperture in said ear, said ear mountable on said rod so that said flange removably and rockably seats in said groove whereby said storage member is swingably depended from said rod, said storage member formed with an internal chamber for receiving a phonograph record, and said chamber communicating with a portion of the perimeter of said storage member to form a passageway for a phonograph record into said chamber.

4. A device as defined in claim 3 including a closure means for said passageway.

5. A device as defined in claim 3 including an arcuate arm provided with a longitudinal slot, and said arm pivotally secured at one end to said storage member so it can be moved to a position where said slot embraces the perimeter of said storage member at the area of said passageway to serve as a closure therefor.

6. A phonograph record holder, comprising, a horizontal rod provided with a transverse groove, means for supporting said rod, a phonograph record storage member, an apertured ear integral with and projecting from an edge of said storage member, an internally projecting flange from the aperture in said ear, and said ear mountable on said rod so that said flange removably and rockably seats in said groove whereby said storage member is swingably depended from said rod.

7. A phonograph record holder, comprising, a horizontal rod provided with a transverse groove, means for supporting said rod, a phonograph record storage member, an apertured ear integral with and projecting from an edge of said storage member, and said ear mountable on said rod so as to be removably and rockably seated in said groove whereby said storage member is swingably depended from said rod.

8. A phonograph record holder, comprising, a horizontal rod provided with a transverse groove, means for supporting said rod, a record storage member, an apertured ear integral with and projecting from an edge of said storage member, an internally projecting flange from the aperture in said ear, said ear mountable on said rod so that said flange removably and rockably seats in said groove whereby said storage member is swingably depended from said rod, said storage member formed with an internal chamber for receiving a phonograph record, and said chamber communicating with a portion of the perimeter of said storage member to form a passageway for a phonograph record into said chamber.

9. A phonograph record holder, comprising, a horizontal rod provided with a transverse groove, means for supporting said rod, a record storage member, an apertured ear integral with and projecting from an edge of said storage member, said ear mountable on said rod so as to be removably and rockably seated in said groove whereby said storage member is swingably depended from said rod, said storage member formed with an internal chamber for receiving a phonograph record, and said chamber communicating with a portion of the perimeter of said storage member to form a passageway for a phonograph record into said chamber.

10. A phonograph record holder, comprising, a horizontal rod, means for supporting said rod, a phonograph record storage member, an apertured ear integral with and projecting from an edge of said storage member, said ear removably and rockably mounted on said rod, whereby said storage member is swingably depended from said rod, and means on said rod for preventing movement of said ear longitudinally of said rod.

11. A phonograph record holder, comprising, a horizontal rod, means for supporting said rod, a phonograph record storage member, an apertured ear integral with and projecting from an edge of said storage member, said ear removably and rockably mounted on said rod, whereby said storage member is swingably depended from said rod, and spacer means on said rod for preventing movement of said ear longitudinally of said rod.

References Cited in the file of this patent

UNITED STATES PATENTS

| | | |
|---|---|---|
| 1,101,623 | Evans | June 30, 1914 |
| 1,490,422 | Frank | Apr. 15, 1924 |
| 1,502,910 | Dilas | July 29, 1924 |
| 1,739,895 | Gamble | Dec. 17, 1929 |
| 1,759,749 | Knight | May 20, 1930 |
| 2,344,919 | Kelly | Mar. 21, 1944 |

FOREIGN PATENTS

| | | |
|---|---|---|
| 117,805 | Switzerland | Dec. 1, 1926 |